US012331655B2

(12) United States Patent
Davis et al.

(10) Patent No.: US 12,331,655 B2
(45) Date of Patent: Jun. 17, 2025

(54) AEROFOIL AND METHOD

(71) Applicant: SIEMENS ENERGY GLOBAL GMBH & CO. KG, Munich (DE)

(72) Inventors: Anthony Davis, Bassingham (GB); Heather Lamming, Lincoln (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 24 days.

(21) Appl. No.: 18/282,290

(22) PCT Filed: Mar. 23, 2022

(86) PCT No.: PCT/EP2022/057694
§ 371 (c)(1),
(2) Date: Sep. 15, 2023

(87) PCT Pub. No.: WO2022/214320
PCT Pub. Date: Oct. 13, 2022

(65) Prior Publication Data

US 2024/0159153 A1 May 16, 2024

(30) Foreign Application Priority Data

Apr. 8, 2021 (GB) ..................................... 2105026

(51) Int. Cl.
*F01D 5/18* (2006.01)

(52) U.S. Cl.
CPC .......... *F01D 5/187* (2013.01); *F05D 2230/21* (2013.01); *F05D 2250/11* (2013.01); *F05D 2260/20* (2013.01)

(58) Field of Classification Search
CPC .......... F01D 25/12; F01D 5/186; F01D 5/187; F05D 2260/201; F05D 2260/204; F05D 2260/20; F05D 2230/21; F05D 2250/11
See application file for complete search history.

(56) References Cited

U.S. PATENT DOCUMENTS 5,562,409 A * 10/1996 Livsey .................... F01D 5/187 415/115
9,376,918 B2 * 6/2016 Harding .................... F01D 5/18
(Continued)

FOREIGN PATENT DOCUMENTS

EP 1495820 A1 1/2005
EP 2597264 A2 5/2013
(Continued)

OTHER PUBLICATIONS

International Search Report and Written Opinion of the International Searching Authority mailed Aug. 2, 2022 corresponding to PCT Application No. PCT/EP2022/057694 filed Mar. 23, 2022.

*Primary Examiner* — Courtney D Heinle
*Assistant Examiner* — Andrew Thanh Bui

(57) ABSTRACT

An aerofoil for a gas turbine engine comprises a suction side wall, a pressure side wall, a leading edge (215) and a trailing edge (216). The suction side wall (212) and the pressure side wall (213) extend from a first end to a second end and meet to define the leading edge and the trailing edge. The suction side wall (212) and pressure side wall (213) further comprise cooling passages (218*c*) within the wall thickness of the aerofoil walls (217), the cooling passages comprising hollow triangular passages (218*c*).

14 Claims, 6 Drawing Sheets

(56) References Cited

U.S. PATENT DOCUMENTS

| | | | | |
|---|---|---|---|---|
| 9,382,811 | B2 * | 7/2016 | Harding | F01D 25/12 |
| 10,563,519 | B2 * | 2/2020 | Webster | F01D 9/041 |
| 10,590,779 | B2 * | 3/2020 | Whitfield | F02C 9/18 |
| 11,008,873 | B2 * | 5/2021 | Banks | F01D 5/187 |
| 2005/0265837 | A1 | 12/2005 | Liang | |
| 2013/0136599 | A1 * | 5/2013 | Harding | F01D 25/12<br>416/95 |
| 2014/0064967 | A1 * | 3/2014 | Harding | F01D 5/18<br>416/223 A |
| 2016/0319678 | A1 * | 11/2016 | Staroselsky | F01D 5/282 |
| 2016/0333701 | A1 * | 11/2016 | Lewis | F01D 5/187 |
| 2019/0169998 | A1 * | 6/2019 | Whitfield | F01D 5/187 |
| 2019/0257205 | A1 * | 8/2019 | Webster | F01D 5/187 |
| 2020/0248565 | A1 * | 8/2020 | Banks | F01D 5/20 |

FOREIGN PATENT DOCUMENTS

| | | | |
|---|---|---|---|
| EP | 2631431 | A1 | 8/2013 |
| EP | 3124745 | A1 | 2/2017 |
| EP | 3495617 | A1 | 6/2019 |
| EP | 3693547 | A1 | 8/2020 |

* cited by examiner

AEROFOIL AND METHOD

This invention relates to an aerofoil, in particular for a gas turbine blade, or vane and associated cooling system and method.

It is necessary to cool aerofoils of a gas turbine engine to prevent overheating and prolong service life. Walls of the aerofoil also define internal cooling passages through which coolant is channeled during engine operation. Uneven cooling of the aerofoil and unacceptable temperature gradients may reduce service life or cause performance problems. A relatively high cooling flow may be needed to maintain the component at a required temperature to meet component life requirements, but a relatively high cooling air flow is detrimental to overall engine efficiency. Improvements in the cooling effect are desired.

In accordance with a first aspect of the present invention, an aerofoil for a gas turbine engine comprises a suction side wall, a pressure side wall, a leading edge and a trailing edge, the suction side wall and the pressure side wall extending from a first end to a second end and meeting to define the leading edge and the trailing edge; the suction side wall and the pressure side wall forming a cavity therebetween for the flow of a coolant therethrough, characterised in that the suction side wall and pressure side wall further comprise cooling passages within the wall thickness of the aerofoil walls, the cooling passages comprising hollow triangular passages.

Although rectangular or semi-circular cooling passages provide reasonable contact area with the hot surface of an aerofoil, blade or vane, the most effective arrangement is where the cooling passages comprise hollow triangular passages, in a radial direction.

Although, aerofoils may comprise solid metal, or cavities may be formed between the pressure and section wall that perform no effective heating, advantageously, the suction side wall and the pressure side wall form a cavity therebetween for the flow of a coolant therethrough, The hollow triangular passages may comprise first, second and third adjacent walls, at least two of which are of different lengths.

This enables the longest side to be located near to the hot surface of the wall.

Although in some cases, the length of the side closest to the hot surface of the wall may not be the longest of the three sides, greater cooling effect is obtained if the longest side of the triangle is next to the hot surface and in particular where the first wall has a length at least 1.25 times the length of one of the second and third walls.

The minimum length of any one side of the triangle in the wall is determined by the manufacturing tolerances. For current additive manufacturing this limit is at least 0.6 mm, although with advances in manufacturing techniques, this may change, but advantageously, the second or third walls have a length of at least 0.6 mm, in particular, between 1 mm and 1.5 mm.

The second or third walls may have a length of up to 5 mm.

The hollow triangular passages may further comprise turbulators, in the form of roughened or dimpled inner surfaces.

This has the advantage of increasing the cooling effect in the passages and the benefit that a rough surface is a naturally occurring effect in additive manufacturing, so no additional post processing step is needed.

The aerofoil may be monolithically formed in a casting step or in an additive manufacturing process, or a hybrid process.

An aerofoil may be part of a vane, the vane comprising a radially inner platform and a radially outer platform, the aerofoil spanning between the radially inner platform and the radially outer platform.

The aerofoil may be part of a blade, the blade comprising a platform and a tip, the aerofoil spanning between the platform and the tip.

In accordance with a second aspect of the present invention, a gas turbine blade directed along a blade axis and having an aerofoil leading edge and an aerofoil trailing edge in an aerofoil defined by a suction side wall and a pressure side wall surrounding an inner cooling structure, the cooling structure comprising broad channels directed along the blade axis for directing a cooling fluid from the aerofoil leading edge to the aerofoil trailing edge, characterized in that the turbine blade aerofoil suction side wall and pressure side walls further comprise cooling passages within the wall thickness of the aerofoil walls, the cooling passages comprising hollow triangular passages.

In accordance with a third aspect of the present invention, a method of manufacturing an aerofoil according to any preceding claim, the method comprising monolithically forming the aerofoil in a casting step or in an additive manufacturing process.

Waxes for defining an internal cooling channel in a casting step may be applied by additive manufacturing in combination with a ceramic core.

This hybrid manufacturing method enables the use of in wall cooling channels in conventionally investment cast turbine blades and vanes.

An example of an aerofoil for a gas turbine blade, or vane and a cooling system and associated method in accordance with the present invention will now be described with reference to the accompanying drawings in which.

The operating temperatures of a gas turbine engine usually require the initial stage of the turbine to have internal cooling in order to achieve a realistic service life. Many designs of internal cooling have been proposed for this purpose, typically feeding cooling fluid from the leading edge to the trailing edge through the cavity formed by a suction side wall and a pressure side wall. However high heat transfer rates are usually matched with high pressure loss, so limiting the amount of heat that can be extracted from a cooling system with a set inlet to outlet pressure ratio. The present invention addresses this problem using a cooling passage design that combines enhanced heat transfer with low pressure losses Cooling designs for turbine components have predominantly used rectangular shaped passages formed between the suction side wall and pressure side wall, together with enhancement of the heat transfer by turbulators on one or more of the walls, for example, ribs, pin-fins, dimples, pimples etc. Whilst these features increase the turbulence and so enhance the heat transfer, they also result in significant pressure losses, and so careful design is required to ensure sufficient cooling is achieved, without an excessive decrease in pressure that would lead to low flow or even ingestion of hot gas. Hence it is an advantage to minimize the pressure loss through a cooling passage without compromising the heat transfer.

Figure 1:
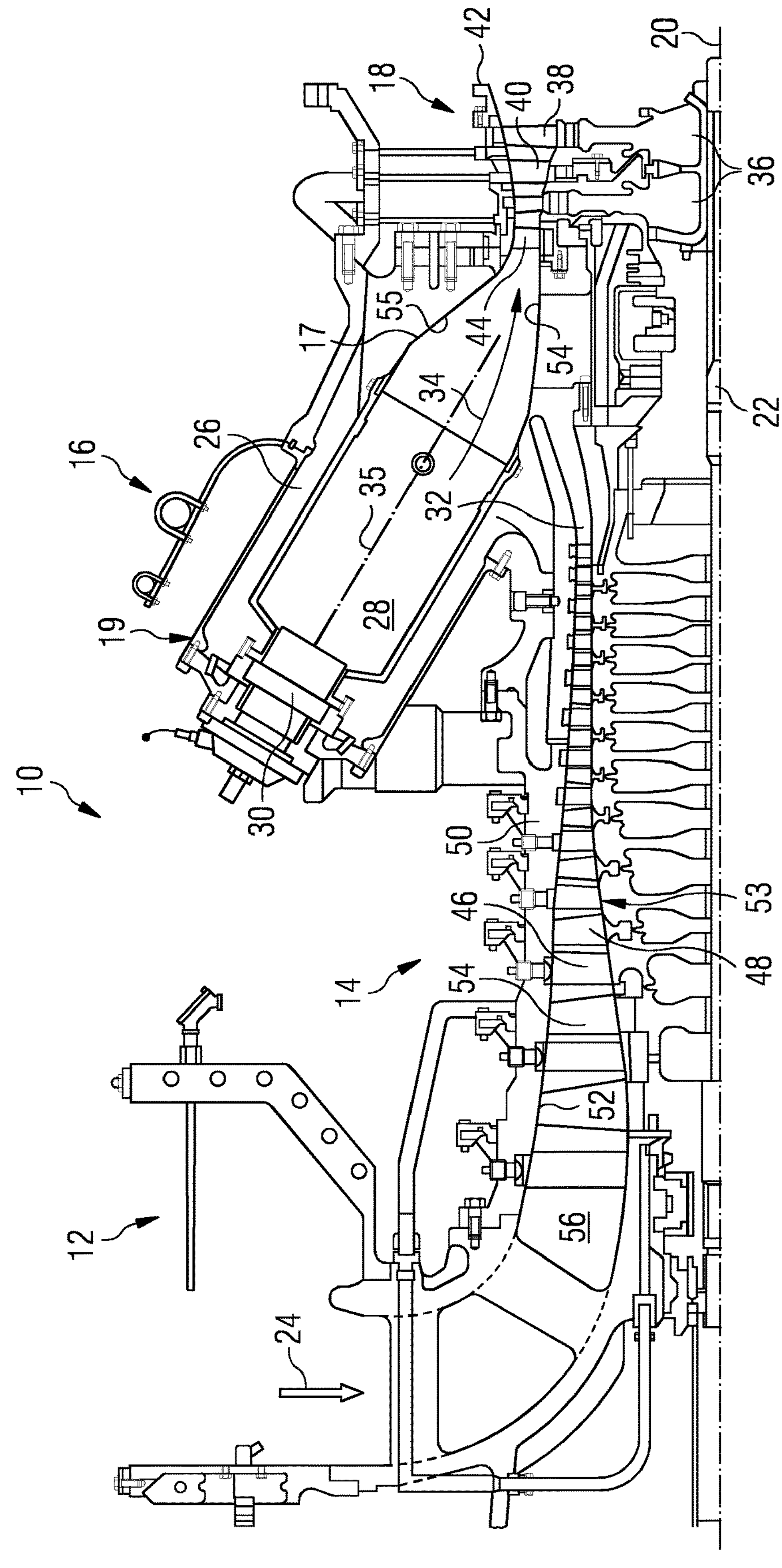
FIG. 1 shows part of a turbine engine in a sectional view and in which the present aerofoil may be incorporated.

FIG. 1 shows an example of a gas turbine engine 10 in a sectional view. The gas turbine engine 10 comprises, in flow series, an inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 having a longitudinal axis 35 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channeled through the combustion chamber 28 to the turbine section 18 via a transition duct 17 having an inner surface 55.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets form an annulus for channeling the combustion gases to the turbine 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the passage 56 of the compressor 14. A radially inner surface 54 of the passage 56 is at least partly defined by a rotor drum 53 of the rotor which is partly defined by the annular array of blades 48.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

The term aerofoil is intended to apply to a stator vane or a rotor blade.

Figure 2:
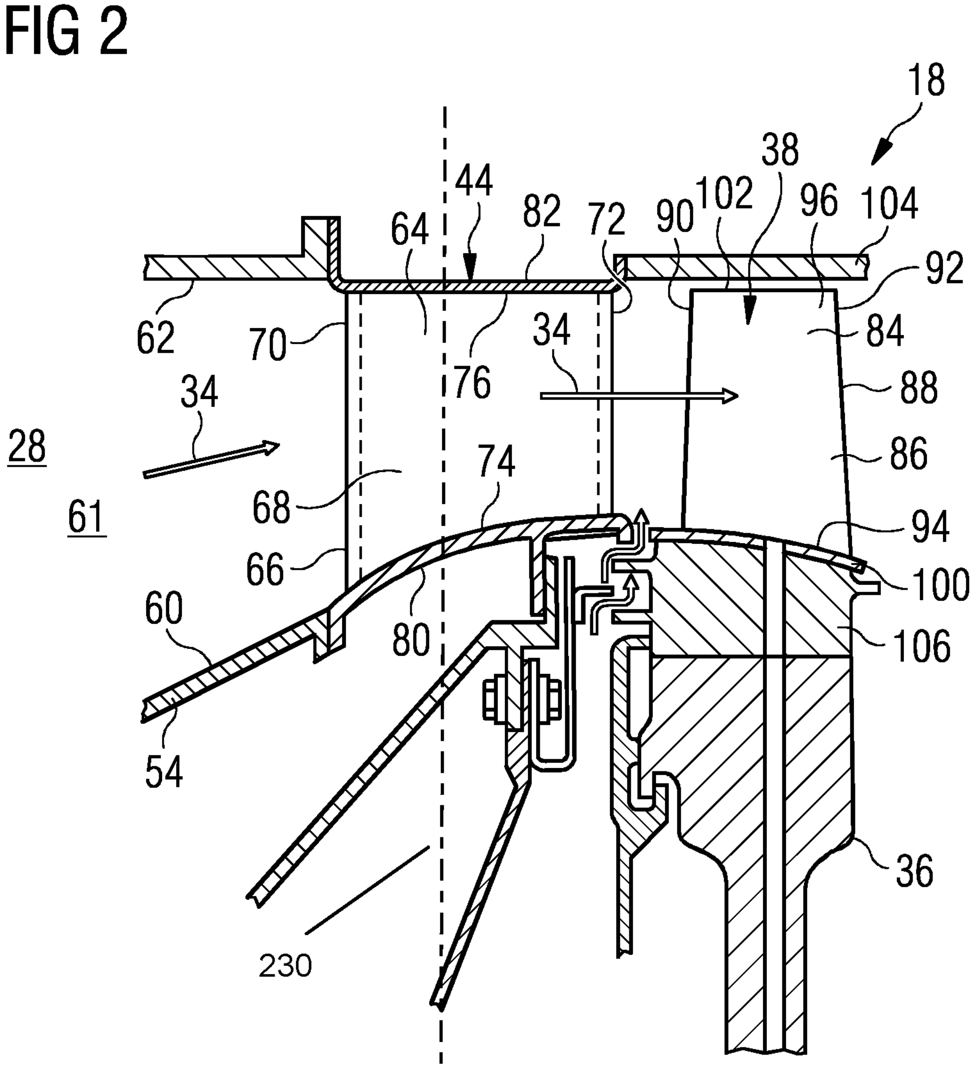
FIG. 2 shows part of a turbine section in a sectional view and in which the present aerofoil may be incorporated.

FIG. 2 shows part of the turbine section 18 of the gas turbine engine 10. As mentioned above and in axial flow sequence of the working gas flow 34 through the turbine section 18 comprises an annular array of inlet guide vanes 44 and then an annular array of blades 38. The working gas flow 34 is channeled between a radially inner annulus 60 and a radially outer annulus 62 which is referred to as the 'gas path' and denoted 61.

The inlet guide vanes 44 comprise at least one aerofoil 64 having a suction side wall 68 and a pressure side wall 66, a leading edge 70 and a trailing edge 72, a first radial end 74 and a second radial end 76. The suction side wall 68 and the pressure side wall 66 extend from the first radial end 74 to the second radial end 76 and meet to define the leading edge 70 and the trailing edge 72. The first radial end 74 is attached to a radially inner platform 80 and the second radial end 76 is attached to a radially outer platform 82. The radially inner platform 80 and the radially outer platform 82 form part of the gas path 61.

The annular array of inlet guide vanes 44 comprises single vanes where there is a single aerofoil 64 mounted between the two platforms 80, 82. However, the annular array of inlet guide vanes 44 may comprise double, triple or more vane segments where there are two, three of more aerofoils 64 mounted between common platforms 80, 82.

The blades 38 comprise one aerofoil 84 having a pressure side wall 86 and a suction side wall 88, a leading edge 90 and a trailing edge 92, a first radial end 94 and a second radial end 96. The suction side wall 88 and the pressure side wall 86 extend from the first radial end 94 to the second radial end 96 and meet to define the leading edge 90 and the trailing edge 92. The first radial end 94 is attached to a radially inner platform 100 and the second radial end 76 is a blade tip 96 and is free. The blade tip 96 forms a tip gap 102 with a casing 104. The radially inner platform 100 and the casing 102 form part of the gas path 61. The tip 96 is a squealer configuration as is known in the art, but in other examples the blade tip 96 may comprise a shroud or a winglet as is known. The blade 38 comprises a root portion 106 which comprises a firtree configuration that engages a complimentary slot formed in the disc 36 for retaining the blades 38 in known manner. Alternatively, the root portion may be a dovetail configuration that engages a complimentary slot formed in the disc 36 for retaining the blades 38 in known manner.

Figure 7:
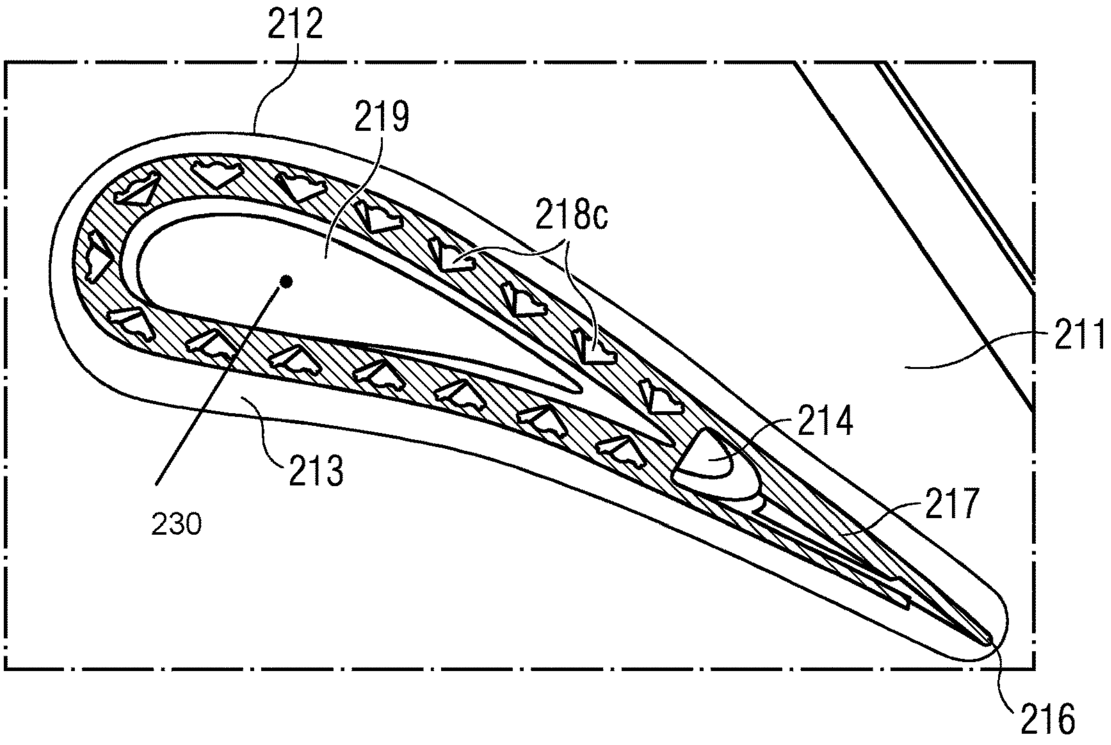
FIG. 7 illustrates a third embodiment of an aerofoil according to the invention.

A blade axis 230 is illustrated in both FIGS. 2 and 7. The gas turbine blade 38 or guide vane 44 is directed along the blade axis 230 and the aerofoil leading edge 90, 70 and aerofoil trailing edge 92, 72 in the aerofoil 84, 64 defined by the suction side wall 88, 68 and the pressure side wall 86, 66 surround an inner cooling structure. The cooling structure comprises broad channels directed along the blade axis 230 for directing a cooling fluid from the aerofoil leading edge 92, 72 to the aerofoil trailing edge. The turbine blade aerofoil suction side wall 88 and pressure side wall 86 further comprise cooling passages 218*c* within the wall thickness of the aerofoil walls 217, as further illustrated in the example of FIG. 7, which shows the cooling passages comprising hollow triangular passages.

The present invention is applicable to the aerofoils 64, 84 of the vane 44 and blade 38. In each of the vane 44 or blade 38, the suction side wall 68, 88 and the pressure side wall 66, 86 form a cavity 219 (see FIGS. 3 to 7) therebetween. The cavity 219 is formed for the flow of a coolant therethrough. The cavity 219 may have many different configurations for optimal cooling depending on each application.

The present invention makes use of the feature that cooling passages embedded in the side wall of an aerofoil, such as a turbine blade or guide vane, are able to increase the cooling effect, without increasing pressure loss, which has not been possible using conventional investment casting techniques. In order to control the heat within the aerofoil, it is desirable that the maximum possible section of the perimeter of a passage is close to the hot wall. Cooling flow along that perimeter in contact with the hot surface, then cools the hot wall. Furthermore, it has been determined that the extent to which the cooling effect is improved depends upon the shape of those cooling passages, the most efficient shape being triangular, but semi-circular cross sections and to a lesser extent rectangular cross sections, may also be used. Efficiency improves for a shape with a relatively high ratio of the section of the perimeter of the cooling passage walls which is closest to the hot surface to the overall perimeter of the cooling passage walls, for a given area bounded by the perimeter walls. Although a circular passage has a relatively small perimeter, only half of the perimeter faces the hot wall and even less is close to the hot surface. A triangle with a very wide base could have nearer to 50% of its perimeter on the hot wall. The shape of the cooling channels, in combination with the improvement by virtue of the location within the walls of the aerofoils enhance the cooling effect. A further benefit is that these embedded cooling channels may be used in combination with existing large scale cooling channels defined by the side walls themselves, to reduce the pressure loss for a set inlet to outlet pressure ratio, with an overall increase in heat transfer rate.

Figure 3:
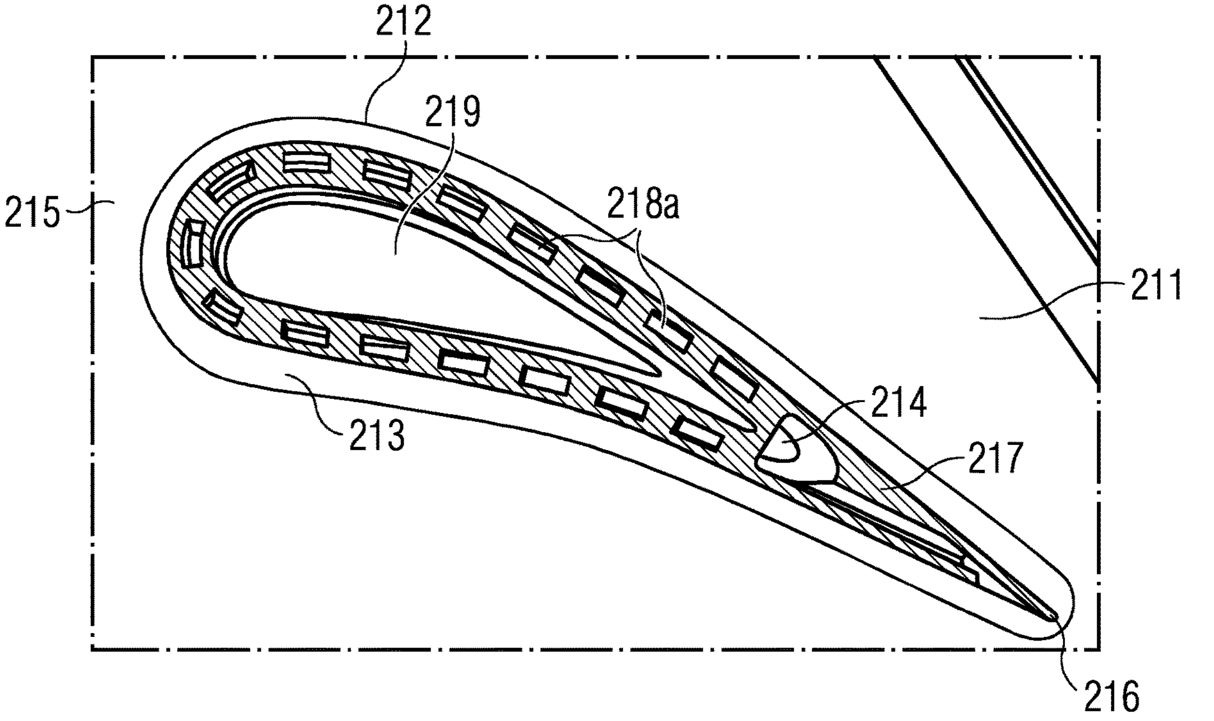
FIG. 3 illustrates a first embodiment of an aerofoil according to the invention.
Figure 4:
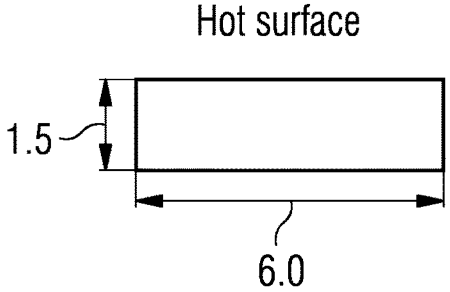
FIG. 4 illustrates the shape of the cooling passages in the wall of the aerofoil of FIG. 2, in more detail.

FIG. 3 illustrates a first example of an aerofoil according to the invention, in which cooling passages 218*a* are formed in the walls 217 of an aerofoil, blade or vane 211. The aerofoil has a leading edge 215 and trailing edge 216 and these edges are formed at the points where a pressure side wall 213 and suction side wall 212 meet. The shape of the side walls 212, 213 in this example is such that a hollow cavity 219 is formed between them. However, if the aerofoil is formed of solid metal, this cavity 219 is not present, although the cooling passages are formed in the same parts of the pressure side wall and suction side wall. The outside edge of the side walls 212, 213, away from this cavity 219, is the hot surface, when the turbine is in operation and the inside edge of the sidewalls which define the cavity, is the cool side. In addition, a large cooling channel 214 is formed above the trailing edge, along the length of the blade from the hub to the tip. The side wall thickness is typically substantially uniform between the leading edge and this large cooling channel 214, closest to the leading edge 215. Thereafter, the wall thickness reduces, tapering down to the trailing edge 216. FIG. 4 illustrates the shape of the in-wall cooling channels more clearly. For a rectangular cooling channel, having sides of length 6 units and 1.5 units, then the overall perimeter of the passage is 15 units, the section of the perimeter close to the hot wall is 6 units and the ratio of the hot wall perimeter to the total perimeter is 0.4.

Figure 5:
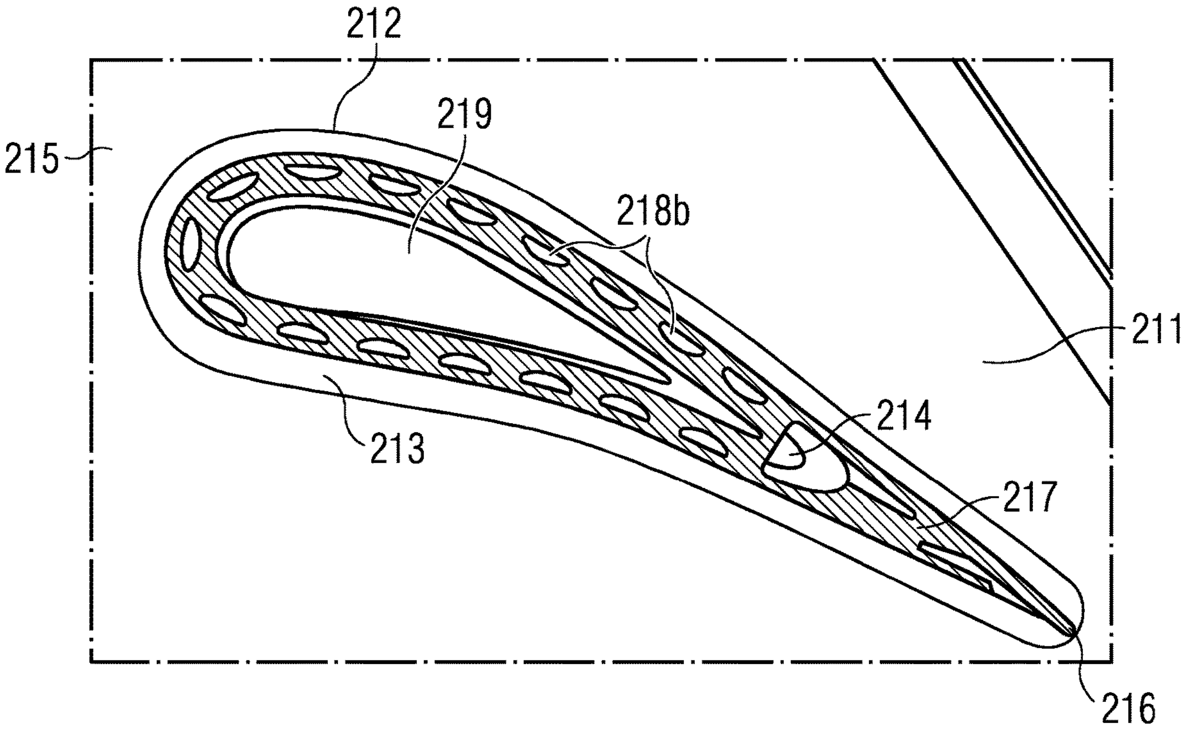
FIG. 5 illustrates a second embodiment of an aerofoil according to the invention.
Figure 6:
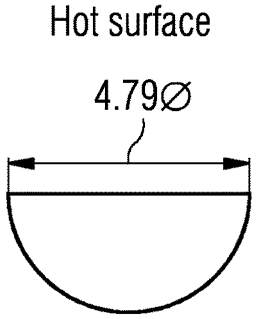
FIG. 6 illustrates the shape of the cooling passages in the wall of the aerofoil of FIG. 5, in more detail.

FIG. 5 illustrates a second example of a turbine aerofoil according to the invention, in which shaped cooling passages 218*b* are formed in the walls 217 of an aerofoil, blade or vane 211. As before, the aerofoil has a leading edge 215 and trailing edge 216 and these edges are formed at the points where a pressure side wall 213 and suction side wall 212 meet. The shape of the side walls 212, 213 is such that a hollow cavity 219 is formed between them. The outside edge of the side walls 212, 213, away from this cavity 219, is the hot surface, when the turbine is in operation and the inside edge of the sidewalls which define the cavity, is the cool side. In addition, a large cooling channel 214 is formed above the trailing edge, along the length of the blade from the hub to the tip. The side wall thickness is typically substantially uniform between the leading edge and this large cooling channel 214, closest to the leading edge 215. Thereafter, the wall thickness reduces, tapering down to the trailing edge 216. FIG. 6 illustrates the in wall cooling channels in more detail. For a semi-circular cooling channel of area 9 units, with a straight side of 4.79 units and a curved side of length 7.52 units and an overall passage perimeter of 12.31 units, the section of the perimeter closest to the hot wall is 4.79 units and the ratio of the hot wall perimeter to the total perimeter is 0.389.

However, the most effective shape for the cooling passages is to use a triangular cross section for the passages and FIG. 7 illustrates a third example of an aerofoil for a turbine according to the invention, in which triangular cooling passages 218*c* are formed in the walls 217 of an aerofoil, blade or vane 211. As before, the aerofoil has a leading edge 215 and trailing edge 216 and these edges are formed at the points where a pressure side wall 213 and suction side wall 212 meet. The shape of the side walls 212, 213 is such that a hollow cavity 219 is formed between them. The outside edge of the side walls 212, 213, away from this cavity 219, is the hot surface, when the turbine is in operation and the inside edge of the sidewalls which define the cavity, is the cool side. In addition, a large cooling channel 214 is formed above the trailing edge, along the length of the blade from the hub to the tip. The side wall thickness is typically substantially uniform between the leading edge of this large cooling channel 214, closest to the leading edge 215. Thereafter, the wall thickness reduces, tapering down to the trailing edge 216. As can be understood from FIGS. 2 and 7, the aerofoil for a gas turbine engine comprises a suction side wall 88, 68, a pressure side wall 86, 66, a leading edge 90, 70 and a trailing edge 92, 72. The suction side wall 88, 68 and the pressure side wall 86, 66 extend from a first end to a second end of the aerofoil and meet to define the leading edge 90, 70 and the trailing edge 92, 72. The suction side wall 88, 68 and pressure side wall 86, 66 further comprise cooling passages 218*c* within the wall thickness of the aerofoil walls 217, the cooling passages comprising hollow triangular passages. The arrangement of these passages may be a radial arrangement with respect to an axis of the aerofoil, or vane, or radial with respect to the central rotational axis 20 of the engine in which the aerofoil or vane is mounted.

Figure 8:
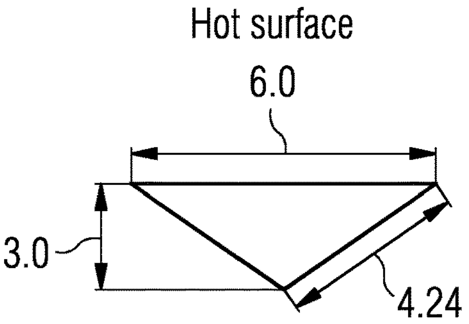
FIG. 8 illustrates a first option for the shape of the cooling passages in the wall of the aerofoil of FIG. 7, in more detail.
Figure 9:
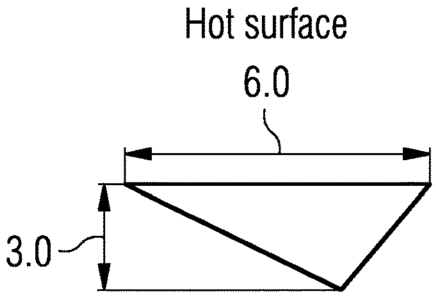
FIG. 9 illustrates a second option for the shape of the cooling passages in the wall of the aerofoil of FIG. 7, in more detail.
Figure 10:
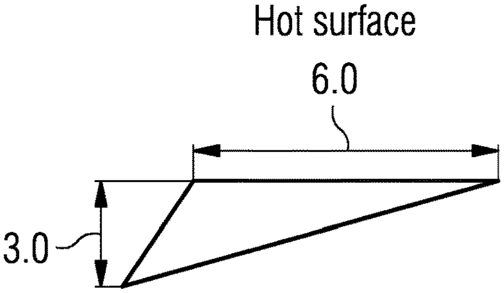
FIG. 10 illustrates a third option for the shape of the cooling passages in the wall of the aerofoil of FIG. 7, in more detail; and, FIGS. 11*a* and 11*b* illustrate a triangular passage with added turbulators on the hot side wall in an aerofoil according to the invention.

FIG. 8 illustrates the shape of the in wall cooling channels more clearly. For this particular example of an isosceles triangle cooling channel of area 9 units, with an overall passage perimeter of 14.48 units, two sides of 4.24 units and the section of the perimeter closest to the hot wall of 6 units, then the ratio of the hot wall perimeter to the total perimeter is 0.414. FIGS. 9 and 10 show further examples of triangular passages which have different length sides for all three sides to obtain a long side for locating close to the hot surface.

The present invention provides a design of cooling passage that optimizes the portion of the passage wall closest to the hot surface of the component and is also viable for additive manufacturing methods. A circular passage cross section is not ideal for heat transfer from a hot wall as only a small portion of the passage wall, roughly ¼ of the perimeter, is close to the hot surface. This gives a ratio of the perimeter close to the hot wall (Hw) to perimeter of the passage (P) of 0.25. A semi-circular passage with the flat wall adjacent to the hot wall as shown in FIG. 5, with the same total area is better, as the flat surface forming the diameter is adjacent to the hot wall enabling a larger cooled surface adjacent to the hot wall. However, the perimeter of the passage also increases, in this case, by 15.7%, resulting in a Hw/P ratio of 0.389. By contrast, a triangular passage of the same area, as shown in FIG. 7, is able to have an even longer wall adjacent to the hot surface (and so greater heat transfer from the hot wall), but also has longer perimeter than a circle, resulting in a Hw/P ratio of 0.414. A rectangular passage, as illustrated in FIGS. 3 and 4, with the same length of hot wall as the triangular passage and the same area has a greater perimeter resulting in a Hw/P ratio of 0.4. Hence a triangular shape passage gives the greatest portion of the perimeter close to the hot wall, which allows more heat to be extracted from the hot wall using a triangular passage, than any of the other shapes considered. The aerofoil and host vane or blade may be monolithically formed in a casting step during manufacturing, or alternatively, the aerofoil may be monolithically formed in an additive manufacturing process.

Figure 11A:
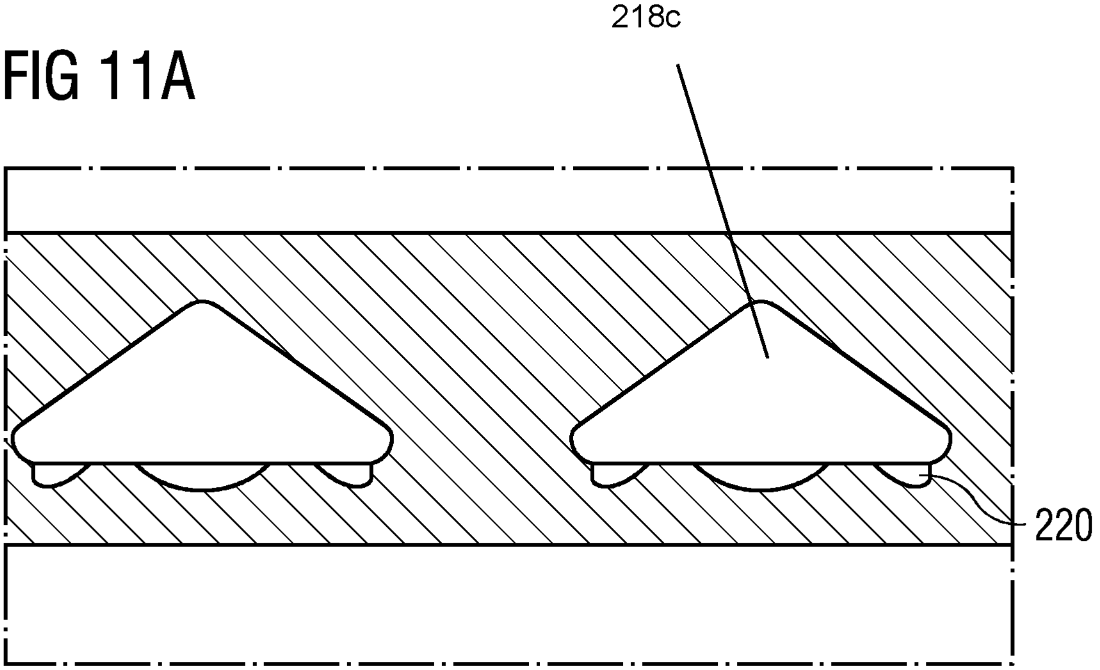
Figure 11B:
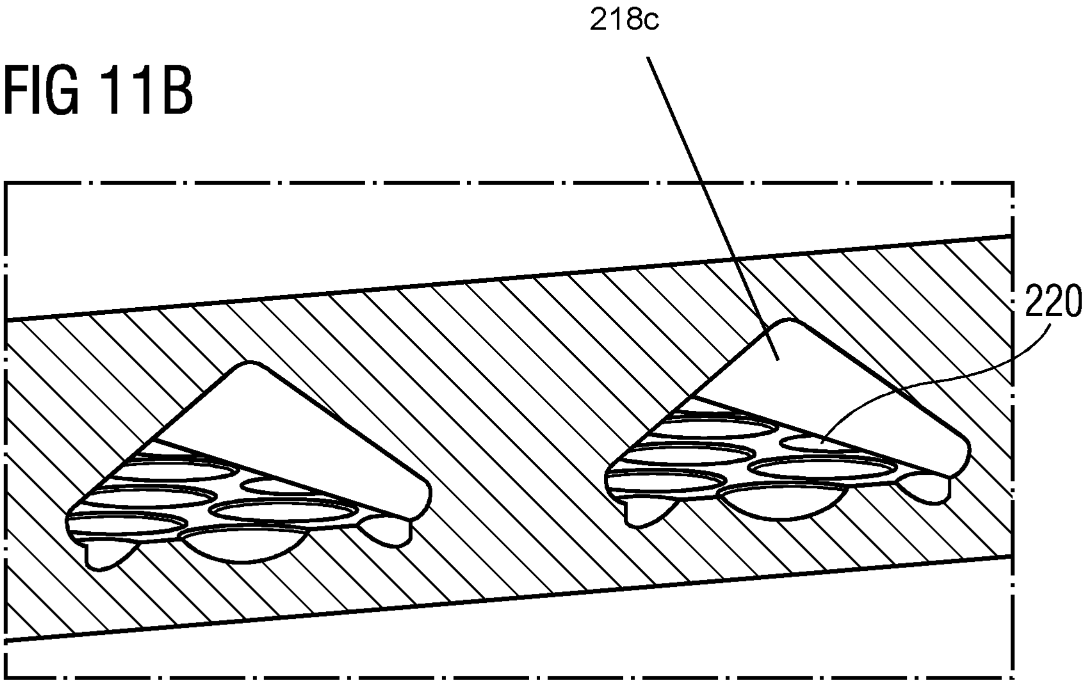

A further benefit of the triangular shaped passage is that flat surfaces are easier to manufacture than curved surfaces and as all of the sides are flat surfaces, then the triangular passage also has the advantage that this shape of passage may be distorted as shown in FIGS. 9 and 10 to ease manufacture in order to avoid overhanging flat surfaces, so allowing the use of additive manufacturing methods, rather than casting, or machining. Further performance improvements may be achieved by arranging that the wall close to the hot surface has enhanced surface heat transfer, for example, by the addition of turbulators 220, such as ribs, pin-fins, dimples, pimples etc, as shown in FIGS. 11*a* and 11*b*, or for turbulators to be added to more than one of the passage walls, provided that this does not result in undue blockage of the passage. The turbulators increase turbulence to mix the cooling air and get the maximum heat transfer, with for example, up to 40% increase in heat transfer possible from dimples on a flat surface.

The longest wall of the triangle is arranged to be parallel, or substantially parallel to the hot surface, so that the ratio of the cooling passage wall adjacent to the hot wall to passage perimeter (Hw/P) for a set passage area is optimized, resulting in more heat transfer from a hot wall than for other passage shapes. The passage shape, in particular the triangular shape, may be altered to ease manufacturing without compromising heat transfer or pressure loss, by adjusting the relative lengths or angles of the sides. Heat transfer may be further increased by the addition of turbulators on one or more of the passage walls.

In use in a gas turbine, the triangular passage cross section provides an improvement of heat transfer from a hot external surface of a turbine aerofoil on a blade or vane compared to a passage of different shape but the same cross-sectional area. The shape of the passage so formed by the sides of the triangle may be deformed to aid manufacturing methods (including additive manufacturing), whilst still having the same level of heat transfer. The shape allows for further enhancement of the heat transfer by addition of conventional turbulators, such as ribs, pin-fins, dimples, etc, to one or more of the inner surfaces of the sides of the passage. Although, other passage shapes are possible, these would have a lower hot-wall to perimeter ratio than the triangular passage, and therefore have lower heat transfer from the hot wall.

The present invention is particularly well suited to additive manufacturing techniques. Additive manufacturing reduces the limits on the shape of the passage that can be formed, as compared to a cast aerofoil. However, in additive manufacturing, it is not possible to generate downward facing horizontal surfaces, which are unsupported. The advantage of the triangular design is that the angles can be adjusted to have a large wall parallel and perhaps two unequal lengths for the other walls, so that there are no unsupported surfaces, but the cooling effect is maximised. The print orientation may be adapted to get a desired shape, for example, the triangles may have some radial element to fit the manufacturing process.

A typical manufacturing method is to use laser powder bed fusion (L-PBF), at relatively low power, also known as selective laser melting (SLM), building up a very thin powder layer onto a build plate and using a laser to follow a predetermined path to locally heat and melt the current powder layer and subsequent powder layers beneath. This process is then repeated until all layers have been added selectively completing the part. A limit on the length of the sides of the triangular passage is the minimum distance possible with the additive manufacturing process. Currently, this would limit to 0.6 mm on each edge of a triangle, although with improvements in the additive manufacturing equipment and technologies, this may change over time. A natural feature of additive manufacturing is that it can give a very rough surface finish and need a smoothing operation, which is difficult or impossible to achieve on an internal surface, due to access issues. However, the naturally rough surface helps with heat transfer by causing more turbulence, so this saves a post processing step, both in trying to smooth the surface or to add turbulators, as they are effectively built into the passage manufacturing step. Care needs to be taken to ensure that the roughening does not result in too much blocking effect in the small passages. Typically, this means that the passage width would not be below 0.6 mm, as that tends to produce too much friction and pressure loss from the roughening. An advantageous range for a passage defined by the length of the wall closest to the hot wall of greater than 0.6 mm width, is between 1.0 mm and 1.5 mm, in particular around 1.2 mm. However, as additive manufacturing machines increase in size, then a large passage width may become possible, for example, up to 5 mm passages, for large gas turbine blades.

Other methods include wire arc additive manufacturing (WAAM), where a robot follows a pattern and the layering is similar to a bead of weld; wire laser additive manufacturing (WLAM); direct energy deposition (DED), or electron beam melting (EBM) of either powder or wire. Additional post processing operations may be carried out using conventional subtractive manufacturing methods such as turning, milling & grinding are necessary to finish the AM component as all current AM technologies produce a near net shape only. Some Additive Manufacturing methods such as DED or WAAM or WLAM have the added benefit of being able to produce parts from multiple materials as the feed stock (wire or powder) can be changed part way through build or another nozzle can be introduced creating an alloyed or cladded component. Some processes, e.g., directed energy deposition allow circle skin to be made with one powder and another nozzle for rest of structure. Abrasive slurries may be used to improve surface roughness of internal channels, if desired. In another embodiment, a hybrid manufacturing method is possible whereby an investment casting manufacturing method may be combined with additive manufacturing in that the waxes used to make the internal cooling system may be additively manufactured, as well as the ceramic core. This enables the use of in-wall cooling channels in otherwise conventionally investment cast, turbine blades and vanes.

As can be seen from FIGS. 3, 5 and 7, the embedded cooling passages formed and located within in the pressure side wall and suction side walls do not interfere with cooling air supply plenums defined by the thick side walls and formed inside the large cavity in the blade between those side walls. The large cavity cooling includes inlet and outlet tubes, the inlet impingement tubes blasting jets of air against the inside wall of the turbine blade.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. An aerofoil for a gas turbine engine, the aerofoil comprising a suction side wall, a pressure side wall, a leading edge and a trailing edge, the suction side wall and the pressure side wall extending from a first end to a second end and meeting to define the leading edge and the trailing edge; wherein the suction side wall and pressure side wall further comprise cooling passages extending in a radial direction with respect to a central/longitudinal axis of the aerofoil within the wall thickness of the aerofoil walls, the cooling passages comprising hollow triangular passages, wherein the hollow triangular passages further comprise roughened or dimpled inner surfaces, wherein the hollow triangular passages are defined by first, second and third adjacent walls, wherein a length of the first adjacent wall is located to face a hot surface of the aerofoil, wherein the first adjacent wall has a longer length relative to respective lengths of the second and third adjacent walls, wherein for a given cross-sectional area of the cooling passage, a ratio of the length of the first wall relative to a perimeter of the cooling passage is chosen to promote heat transfer between the hot surface of the aerofoil and the first wall while inhibiting pressure loss when a coolant flows through the cooling passage.

2. The aerofoil according to claim 1, wherein the suction side wall and the pressure side wall form a cavity therebetween for the flow of the coolant therethrough.

3. The aerofoil according to claim 1, wherein the hollow triangular passages are arranged in a radial direction with respect to a central axis of the aerofoil.

4. The aerofoil according claim 1, wherein at least two of the first, second and third adjacent walls are of different lengths.

5. The aerofoil according to claim 1, wherein the first wall has a length of at least 1.25 times the length of one of the second and third walls.

6. The aerofoil according claim 1, wherein the second or third walls have a length of at least 0.6 mm, or wherein the length is in a range between 1 mm and 1.5 mm.

7. The aerofoil according to claim 1, wherein the second or third walls have a length of up to 5 mm.

8. The aerofoil according to claim 1, wherein the aerofoil is monolithically formed by way of casting or by way of additive manufacturing.

9. The aerofoil according to claim 1, wherein the aerofoil is part of a vane, the vane comprising a radially inner platform and a radially outer platform, the aerofoil spanning between the radially inner platform and the radially outer platform.

10. The aerofoil according to claim 1, wherein the aerofoil is part of a blade, the blade comprising a platform and a tip, the aerofoil spanning between the platform and the tip.

11. A gas turbine blade having an aerofoil leading edge and an aerofoil trailing edge in the aerofoil defined by a suction side wall and a pressure side wall surrounding an inner cooling structure, the cooling structure comprising broad channels directed for directing a cooling fluid from the aerofoil leading edge to the aerofoil trailing edge, wherein the turbine blade aerofoil suction side wall and pressure side walls further comprise cooling passages extending in a radial direction with respect to a central/longitudinal axis of the aerofoil within the wall thickness of the aerofoil walls, the cooling passages comprising hollow triangular passages, wherein the hollow triangular passages further comprise roughened or dimpled inner surfaces, wherein the hollow triangular passages are defined by first, second and third adjacent walls, wherein a length of the first adjacent wall is located to face a hot surface of the aerofoil, wherein the first adjacent wall has a longer length relative to respective lengths of the second and third adjacent walls, wherein for a given cross-sectional area of the cooling passage, a ratio of the length of the first wall relative to a perimeter of the cooling passage is chosen to promote heat transfer between the hot surface of the aerofoil and the first wall while inhibiting pressure loss when a coolant flows through the cooling passage.

12. A method of manufacturing an aerofoil according to claim 1, the method comprising monolithically forming the aerofoil in a casting step or in an additive manufacturing process.

13. A method according to claim 12, wherein waxes for defining an internal cooling channel in a casting step are applied by additive manufacturing in combination with a ceramic core.

14. A method of manufacturing the gas turbine blade according to claim 11, the method comprising monolithically forming the aerofoil in a casting step or in an additive manufacturing process.

* * * * *